US011851613B2

(12) United States Patent
Cairns et al.

(10) Patent No.: US 11,851,613 B2
(45) Date of Patent: Dec. 26, 2023

(54) COMPOSITIONS AND METHODS FOR CONTROLLED DELIVERY OF ACID USING SULFONATE DERIVATIVES

(71) Applicant: Saudi Arabian Oil Company, Dhahran (SA)

(72) Inventors: Amy J. Cairns, Houston, TX (US); Katherine L. Hull, Houston, TX (US); Desmond E. Schipper, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 94 days.

(21) Appl. No.: 17/394,490

(22) Filed: Aug. 5, 2021

(65) Prior Publication Data

US 2022/0041921 A1 Feb. 10, 2022

Related U.S. Application Data

(60) Provisional application No. 63/061,845, filed on Aug. 6, 2020.

(51) Int. Cl.
 *C09K 8/72* (2006.01)
 *E21B 43/27* (2006.01)

(52) U.S. Cl.
 CPC .............. *C09K 8/72* (2013.01); *E21B 43/27* (2020.05); *C09K 2208/10* (2013.01)

(58) Field of Classification Search
 None
 See application file for complete search history.

(56) References Cited

U.S. PATENT DOCUMENTS

| | | |
|---|---|---|
| 3,828,854 A | 8/1974 | Templeton et al. |
| 3,868,998 A | 3/1975 | Lybarger et al. |
| 3,948,324 A | 4/1976 | Lybarger |
| 4,232,741 A | 11/1980 | Richardson et al. |
| 4,324,669 A | 4/1982 | Norman et al. |
| 4,368,136 A | 1/1983 | Murphey |
| 4,502,540 A | 3/1985 | Byham |
| 4,737,296 A | 4/1988 | Watkins |
| 5,964,295 A | 10/1999 | Brown et al. |
| 6,207,620 B1 | 3/2001 | Gonzalez et al. |
| 6,431,279 B1 | 8/2002 | Zaid et al. |
| 7,166,560 B2 | 1/2007 | Still et al. |
| 7,753,123 B2 | 7/2010 | Fuller |
| 7,947,629 B2 | 5/2011 | Fuller |
| 9,512,350 B2 | 12/2016 | Vo |
| 9,725,643 B2 | 8/2017 | De Wolf et al. |
| 10,895,140 B2 | 1/2021 | Cairns et al. |
| 11,156,070 B2 | 10/2021 | Sayed et al. |
| 2004/0009880 A1 | 1/2004 | Fu |
| 2008/0017382 A1 | 1/2008 | Harris et al. |
| 2008/0139412 A1 | 6/2008 | Fuller |
| 2008/0214414 A1* | 9/2008 | Carroll ............. C09K 8/72 |
| | | 507/247 |
| 2009/0025933 A1 | 1/2009 | Garcia-Lopez de Victoria et al. |
| 2009/0042750 A1 | 2/2009 | Pauls et al. |
| 2009/0131285 A1 | 5/2009 | Wang et al. |
| 2009/0281005 A1 | 11/2009 | Qu et al. |
| 2009/0286701 A1 | 11/2009 | Davidson |
| 2010/0323933 A1* | 12/2010 | Fuller ............... C09K 8/524 |
| | | 507/261 |
| 2014/0296113 A1 | 10/2014 | Reyes et al. |
| 2015/0075797 A1 | 3/2015 | Jiang et al. |
| 2015/0080271 A1 | 3/2015 | De Wolf et al. |
| 2016/0244659 A1 | 8/2016 | Shahin et al. |
| 2016/0298024 A1 | 10/2016 | Panga et al. |
| 2017/0081584 A1 | 3/2017 | Shahin et al. |
| 2018/0291720 A1 | 10/2018 | Cairns et al. |
| 2019/0010385 A1 | 1/2019 | Sayed et al. |

(Continued)

FOREIGN PATENT DOCUMENTS

| | | |
|---|---|---|
| CN | 102399550 A | 4/2012 |
| CN | 102899012 A | 1/2013 |

(Continued)

OTHER PUBLICATIONS

Hull, K. L. et al., Bromate Oxidation of Ammonium Salts: In Situ Acid Formation for Reservoir Stimulation, Inorg. Chem., 58:3007-3014 (2019).
International Search Report for PCT/US2018/026247, 4 pages (dated Jun. 19, 2018).
International Search Report for PCT/US2018/038937, 4 pages (dated Oct. 8, 2018).
International Search Report for PCT/US2019/055456, 5 pages (dated Dec. 16, 2019).
Kankaria, S. et al., Matrix Acidizing of Carbonate Rocks Using New Mixtures of HCl/Methanesulfonic Acid. Prepared to be Presented at the SPE International Conference on Oilfield Chemistry held in Montgomery, Texas, USA, SPE-184528-MS (Apr. 3-5, 2017).
Le Page, J.N. et al., An Environmentally Friendly Stimulation Fluid for High Temperature Applications. Presented at the SPE International Symposium on Oilfield Chemistry held in The Woodlands, Texas, USA, SPE-121709-MS (Apr. 20-22, 2009).

(Continued)

*Primary Examiner* — Anuradha Ahuja
(74) *Attorney, Agent, or Firm* — Osha Bergman Watanabe & Burton LLP

(57) ABSTRACT

Compositions and methods for controlled delivery of acid to a desired location, for instance to a subterranean formation, are disclosed. A method for in situ acid stimulation of a subterranean formation that contains a hydrocarbon reservoir and a method for in situ acid treatment of a subterranean formation includes contacting the subterranean formation with (a) a sulfonate-based ammonium salt capable of being oxidized to produce acid; and (b) an oxidizing agent capable of oxidizing the sulfonate-based ammonium salt, where the ammonium salt and oxidizing agent in the aqueous fluid react to produce acid. The method for in situ acid stimulation of a subterranean formation includes stimulating the subterranean formation with the produced acid. The method for in situ acid treatment of a subterranean formation includes treating the subterranean formation with the produced acid.

17 Claims, 1 Drawing Sheet

(56) References Cited

U.S. PATENT DOCUMENTS

| | | | |
|---|---|---|---|
| 2020/0116001 A1 | 4/2020 | Sayed et al. | |
| 2020/0131432 A1* | 4/2020 | Mahmoud | E21B 37/00 |
| 2022/0041922 A1 | 2/2022 | Schipper et al. | |

FOREIGN PATENT DOCUMENTS

| | | |
|---|---|---|
| CN | 105950129 A | 9/2016 |
| EP | 0 181 210 A2 | 5/1986 |
| WO | WO-94/25731 A1 | 11/1994 |
| WO | WO-2004/007905 A1 | 1/2004 |
| WO | WO-2013/189842 A1 | 12/2013 |
| WO | WO-2014/099667 A1 | 6/2014 |
| WO | WO-2015/030801 A1 | 3/2015 |
| WO | WO-2015/038153 A1 | 3/2015 |
| WO | WO-2015/154977 A1 | 10/2015 |
| WO | WO-2015/187178 A1 | 12/2015 |
| WO | WO-2016/018374 A1 | 2/2016 |
| WO | WO-2016/043703 A1 | 3/2016 |
| WO | WO-2016/108877 A1 | 7/2016 |
| WO | WO-2016/180664 A1 | 11/2016 |
| WO | WO-2018/187565 A1 | 10/2018 |
| WO | WO-2018/237237 A1 | 12/2018 |
| WO | WO-2020/076993 A1 | 4/2020 |
| WO | WO-2022/029690 A1 | 2/2022 |
| WO | WO-2022/029692 A1 | 2/2022 |

OTHER PUBLICATIONS

Mahmoud, M.A. et al., Stimulation of Carbonate Reservoirs Using GLDA (Chelating Agent) Solutions. Presented at the SPE Trinidad and Tobago Energy/Resources Conference held in Port of Spain, Trinidad, SPE-132286-MS (Jun. 27-30, 2010).

Mendelowski, T.; Gazda, A., New Method for acid treatment of deep deposits, Nafta (Katowice, Poland), 31(12): p. 36 (1975). English Machine Translation. No known English language copy.

Rabie, A.I. et al., Reaction of GLDA with Calcite: Reaction Kinetics and Transport Study. Presented at the SPE International Symposium on Oilfield Chemistry held in The Woodlands, Texas, USA, SPE-139816-MS (Apr. 11-13, 2011).

Reyath, S.N. et al., Determination of the Diffusion Coefficient of Methanesulfonic Acid Solutions with Calcite Using the Rotating Disk Apparatus. Presented at the SPE International Symposium on the Oilfield Chemistry held in The Woodlands, Texas, USA, SPE-173794-MS (Apr. 13-15, 2015).

Sayed, M and Cairns, A.J., A Low-Viscosity Retarded Acid System for Stimulation of High-Temperature Deep Wells, Offshore Technology Confrence, Houston, Texas, USA, OTC-28838-MA, 20 pages (Apr. 30-May 3, 2018).

Written Opinion for PCT/US2018/026247, 7 pages (mailed Jun. 19, 2018).

Written Opinion for PCT/US2018/038937, 7 pages (mailed Oct. 8, 2018).

Written Opinion for PCT/US2019/055456, 9 pages (mailed Dec. 16, 2019).

Blaskó, C. et al., Oxidations of Organic Sulfides in Aqueous Sulfobetaine Micelles, Jrnl. Coll. Inter. Sci., 175(1):122-130 (1995).

International Search Report for PCT/IB2021/057219, 4 pages (dated Nov. 29, 2021).

International Search Report for PCT/IB2021/057221, 5 pages (dated Dec. 9, 2021).

Written Opinion for PCT/IB2021/057219, 7 pages (dated Nov. 29, 2021).

Written Opinion for PCT/IB2021/057221, 9 pages (dated Dec. 9, 2021).

* cited by examiner

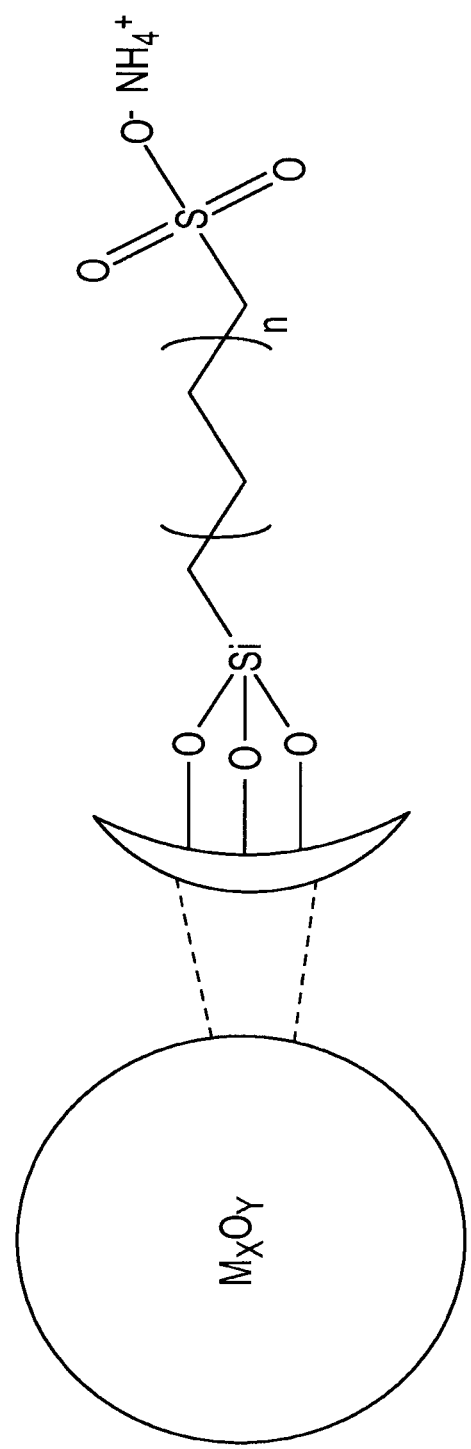

COMPOSITIONS AND METHODS FOR CONTROLLED DELIVERY OF ACID USING SULFONATE DERIVATIVES

CROSS REFERENCE TO RELATED APPLICATIONS

This application claims priority to and the benefit of U.S. Provisional Patent Application Ser. No. 63/061,845, filed Aug. 6, 2020, entitled "COMPOSITIONS AND METHODS FOR CONTROLLED DELIVERY OF ACID USING SULFONATE DERIVATIVES," the disclosure of which is incorporated herein by reference in its entirety.

This application relates to compositions and methods for the controlled delivery of acid, for instance to a subterranean formation.

BACKGROUND

It has been estimated that 60% of the world's oil and 40% of the world's gas reserves lie in carbonate reservoirs (Schlumberger Market Analysis, 2007). The mineralogy of these heterogeneous carbonate formations primarily includes calcite, dolomite or combinations thereof. Accessing oil and/or gas within a carbonate reservoir relies on use of suitable acid stimulation technologies to dissolve calcium and magnesium-based carbonates. Several acid platforms have been proposed and are widely used by oil and gas operators to stimulate carbonate formations. These include use of strong mineral acids (for example, hydrochloric acid, HCl), gelled and emulsified acids, organic-based acids such as formic acid ($CH_2O_2$) and acetic acid ($C_2H_4O_2$) and combinations thereof.

SUMMARY

While previous technologies related to stimulation of a carbonate formation can be effective, improvements are needed to achieve, for example, deeper penetration of acid into a reservoir, and/or to minimize the amount of acid used. The present disclosure encompasses the insight that certain compositions are useful for control of the generation of an acid capable of stimulation of a carbonate formation at a desirable time and/or location, as well as methods for generating acid at certain desirable times and/or locations, which favors deeper penetration of an acid and/or use of less acid than previous methods.

The present disclosure also encompasses the insight that particular ammonium salts (e.g., sulfonate-based ammonium salts) provide improved control over acid generation during stimulation of a carbonate formation. For example, certain ammonium salts exhibit an unexpectedly prolonged induction time when used for acid generation. That is, there is an increased delay of acid generation in situ when a selected ammonium salt is a sulfonate-based ammonium salt. In some embodiments of the present disclosure, for example, use of sulfonate-based ammonium salts yields an induction time that is unexpectedly prolonged as compared to previous studies. See, for example, U.S. Patent Publication No. 2019/0010385 A1.

In the oil and gas industry, as well as other industries such as the biomedical and semiconductor industries, there is a need for controlled delivery of acid, whether inorganic or organic in nature, to site-specific locations at certain times. Provided compositions are useful as a means to, among other things, provide acids to desired locations while remediating a wide range of challenges associated with, for example, corrosive nature of acid, thus mitigating the need for costly corrosion inhibitor packages.

For example, there remain difficulties and safety concerns associated with handling certain acids, including acids characterized as "strong acids." As noted, the oil and gas industry uses acid systems, including strong acids, to stimulate hydrocarbon reservoirs, for instance, carbonate formations. Typically, acid systems are used to create improved flow paths for oil or gas recovery, whether by creating wormholes via dissolution of a carbonate formation or by mitigating damage in a near well-bore region caused by a drilling process. Carbonate formations comprising calcite, dolomite, and the like, are typically stimulated using strong mineral acids, for instance, hydrochloric acid (HCl). Treatment with HCl is often preferred when stimulating carbonate formations, because HCl reacts with calcite and dolomite to yield products that are readily soluble in water; hence formation damage is negligible.

An HCl acid system is very cost-effective and thus economically favorable, but longevity and practical application of acid treatment with HCl is problematic, as HCl increases risk of corrosion and rapidly reacts with carbonate formations, causing live acid to be spent quickly. For example, transfer and handling of corrosive acids at a well site can cause corrosion to drilling equipment, tubing, and casing. Further, large volumes of acid are required to access the depths of a reservoir. Various alternative approaches have been proposed to address these challenges, including but not limited to: (1) organic and synthetic acids, (2) gelled acids, (3) emulsified acids and (4) acid-producing enzymes. These approaches suffer their own inefficiencies.

The present application overcomes the problems associated with previous preparations by providing compositions and methods for controlled delivery of an acid to a particular location (e.g., a carbonate formation) without the risk of corrosion. Accordingly, in some embodiments, the present application provides a composition capable of generating acid in situ at a desired location or time. In some embodiments, the present application provides a composition that exhibits a prolonged induction time of acid generation. In some embodiments, the present application provides a composition comprising a combination of one or more oxidizing agents and one or more salts. In some embodiments, a composition comprises a combination of one or more oxidizing agents and one or more ammonium-based sulfonate salts. In some embodiments, an ammonium-based sulfonate salt is chosen to prolong induction time of acid generation. In some embodiments, the present disclosure provides a composition (e.g., an aqueous fluid) comprising (a) a sulfonate-based ammonium salt capable of being oxidized to produce acid; and (b) an oxidizing agent capable of oxidizing the ammonium salt. In some embodiments, the ammonium salt and the oxidizing agent react to produce acid at a temperature equal to or greater than 65° C.

In some embodiments, the present application provides a method for in situ acid treatment of a subterranean formation comprising controlling delivery of an acid to a subterranean formation that contains a hydrocarbon reservoir, for instance a carbonate, sandstone, or shale formation. In some embodiments, controlled delivery of acid to a subterranean formation that contains a hydrocarbon reservoir reduces occurrence of corrosion to drilling equipment, tubing, and casing associated with treatment with an acid. In some embodiments, controlled delivery of acid to a subterranean formation that contains a hydrocarbon reservoir allows for deeper penetration of acid into a formation than would be achieved otherwise. Accordingly, in some embodiments, the present disclosure provides a method for in situ acid stimulation of a subterranean formation that contains a hydrocarbon reservoir, the method comprising contacting the formation with an aqueous fluid that comprises (a) a sulfonate-based ammonium salt capable of being oxidized to produce acid and (b) an oxidizing agent capable of oxidizing the ammonium salt, where the ammonium salt and oxidizing agent in the aqueous fluid react to produce acid.

In some embodiments, the present disclosure encompasses the insight that controlled delivery of acid to a subterranean formation that contains a hydrocarbon reservoir mitigates formation damage incurred during a drilling process. In some embodiments, formation damage incurred during a drilling process is filter cake damage. Filter cake damage causes a reduction in permeability in a near wellbore region leading to a decline in production. In some embodiments, in order to restore permeability, a damaged zone (i.e. a region of formation exhibiting damage, such as filter cake damage, incurred during a drilling process) is treated by controlled delivery of acid in accordance with methods described herein. In some embodiments, the present disclosure provides a method to dissolve filter cake damage that has propagated deep into a hydrocarbon reservoir. In some embodiments, filter cake damage is caused by carbonate formation. In some embodiments, filter cake damage is caused by calcium carbonate. In some embodiments, the present application describes a method of controlled acid delivery to a subterranean formation for treatment of drilling induced formation damage. In some embodiments, a treatment of drilling induced formation damage involves filter cake solvation. In some embodiments, treatment of drilling induced formation damage increases filter cake permeability. In some embodiments, treatment of drilling induced formation damage involves filter cake removal.

Various embodiments of subject matter described in this application are set forth in the following detailed description and claims.

In some embodiments, the present application is directed to a method for in situ acid stimulation of a subterranean formation that contains a hydrocarbon reservoir, the method comprising contacting the subterranean formation with (a) a sulfonate-based ammonium salt capable of being oxidized to produce acid; and (b) an oxidizing agent capable of oxidizing the sulfonate-based ammonium salt, where the sulfonate-based ammonium salt and the oxidizing agent react to produce an acid.

In some embodiments, a subterranean formation comprises carbonates, sandstone, or shale.

In some embodiments, a sulfonate-based ammonium salt comprises a salt selected from the group consisting of ammonium methanesulfonate, ammonium perfluorobutanesulfonate, ammonium trifluoromethanesulfonate, and mixtures thereof.

In some embodiments, a sulfonate-based ammonium salt is tethered to a nanoparticle to form a sulfonate based-ammonium salt-nanoparticle. In some embodiments, a sulfonate-based ammonium salt-nanoparticle is represented by formula I: $[NP][(M)_p\text{-}(B)_n\text{—}S(O)_2O\text{—}\cdot NH_4^+]$, wherein [NP] is a suitable nanoparticle, M is a metal salt, B is a multifunctional repeating unit selected from aliphatic, heteroaliphatic, and aryl, p is 0 or 1, and n is 0 to 20.

In some embodiments, an oxidizing agent comprises an agent selected from the group consisting of a peroxide, a persulfate salt, a permanganate salt, a bromate salt, a perbromate salt, a chlorate salt, a perchlorate salt, an iodate salt, a periodate salt, and mixtures thereof. In some embodiments, an oxidizing agent comprises sodium bromate.

In some embodiments, a selected sulfonate-based ammonium salt and oxidizing agent react at a temperature of 65° C. or greater to produce acid.

In some embodiments, the present application is directed to an aqueous fluid for in situ acid stimulation of a subterranean formation that contains a hydrocarbon reservoir, where the aqueous fluid comprises (a) a sulfonate-based ammonium salt capable of being oxidized to produce acid and (b) an oxidizing agent capable of oxidizing the ammonium salt, where the ammonium salt and oxidizing agent in the aqueous fluid react to produce acid.

In some embodiments, the present application is directed to a method for in situ acid treatment of a subterranean formation selected from a water injection well, a gas injection well, a water disposal well, and a drill cuttings disposal well, the method comprising contacting the formation with an aqueous fluid that comprises (a) a sulfonate-based ammonium salt capable of being oxidized to produce acid and (b) an oxidizing agent capable of oxidizing the ammonium salt, where the ammonium salt and oxidizing agent in the aqueous fluid react to produce acid.

In some embodiments, the present application is directed to an aqueous fluid for in situ acid treatment of a subterranean formation selected from a water injection well, a gas injection well, a water disposal well, and a drill cuttings disposal well, where the aqueous fluid comprises (a) a sulfonate-based ammonium salt capable of being oxidized to produce acid and (b) an oxidizing agent capable of oxidizing the ammonium salt, where the ammonium salt and oxidizing agent in the aqueous fluid react to produce acid.

In some embodiments, the present application is directed to an aqueous fluid comprising (a) a sulfonate-based ammonium salt capable of being oxidized to produce acid and (b) an oxidizing agent capable of oxidizing the ammonium salt, characterized in that the sulfonate-based ammonium salt and oxidizing agent in the aqueous fluid react to produce acid.

BRIEF DESCRIPTION OF DRAWINGS

The FIGURE shows a sulfonate-based salt tethered to a nanoparticle through repeating units, according to one or more embodiments.

DEFINITIONS

Throughout the specification, several terms are employed that are defined in the following paragraphs. Other definitions may also be found within the body of the specification.

About, Approximately: As used in the present disclosure, the terms "about" and "approximately," in reference to a number, are used to include numbers that fall within a range of 20%, 10%, 5%, 1%, or 0.5% in either direction of (greater than or less than, or ± each indicated number, for example, "about 20%" can refer to ±20% of an indicated value) the number unless otherwise stated or otherwise evident from the context (except where such number would exceed 100% of a possible value).

Aliphatic: As used in the present disclosure, the term "aliphatic" means a straight-chain (i.e., unbranched) or branched, substituted or unsubstituted hydrocarbon chain that is completely saturated or that contains one or more units of unsaturation, or a monocyclic hydrocarbon or bicyclic hydrocarbon that is completely saturated or that contains one or more units of unsaturation, but which is not aromatic (also referred to herein as "carbocycle," "carbocyclic", "cycloaliphatic" or "cycloalkyl"), that has a single point of attachment to the rest of the molecule. Unless otherwise specified, aliphatic groups contain 1-20 aliphatic carbon atoms. In some embodiments, aliphatic groups contain 1-12 aliphatic carbon atoms. In some embodiments, aliphatic groups contain 1-8 aliphatic carbon atoms. In some embodiments, aliphatic groups contain 1-6 aliphatic carbon atoms. In some embodiments, aliphatic groups contain 1-5 aliphatic carbon atoms. In other embodiments, aliphatic groups contain 1-4 aliphatic carbon atoms. In still other embodiments, aliphatic groups contain 1-3 aliphatic carbon atoms, and in yet other embodiments, aliphatic groups contain 1-2 aliphatic carbon atoms. In some embodiments, "carbocyclic" (or "cycloaliphatic" or "carbocycle" or "cycloalkyl") refers to a monocyclic $C_3$-$C_8$ hydrocarbon that is completely saturated or that contains one or more units of unsaturation, but which is not aromatic, that has a single point of attachment to the rest of the molecule. Suitable aliphatic groups include, but are not limited to, linear or branched, substituted or unsubstituted alkyl, alkenyl, alkynyl groups and hybrids thereof such as (cycloalkyl)alkyl, (cycloalkenyl)alkyl or (cycloalkyl)alkenyl. In some embodiments, "heteroaliphatic" refers to an aliphatic group or chain comprising one or more heteroatoms, wherein the term "heteroatom" means one or more of oxygen, sulfur, nitrogen, phosphorus, or silicon (including, any oxidized form of nitrogen, sulfur, phosphorus, or silicon; the quaternized form of any basic nitrogen or; a substitutable nitrogen of a heterocyclic ring, for example N (as in 3,4-dihydro-2H-pyrrolyl), NH (as in pyrrolidinyl) or $NR^+$ (as in N-substituted pyrrolidinyl)).

Alkyl: As used in the present disclosure, the term "alkyl" refers to a fully saturated aliphatic group, for example, an aliphatic group containing no double or triple bonds. Suitable alkenyl groups include, but are not limited to, methyl, ethyl, n-propyl, n-butyl, and the like.

Alkenyl: As used in the present disclosure, the term "alkenyl" refers to an aliphatic group containing at least one double bond. Suitable alkenyl groups include, but are not limited to, ethenyl, n-propenyl, n-butenyl, and the like.

Alkynyl: As used in the present disclosure, the term "alkynyl" refers to an aliphatic group containing at least one triple bond. Suitable alkenyl groups include, but are not limited to, ethynyl, n-propynyl, n-butynyl, and the like.

Aryl: As used in the present disclosure, the term "aryl," used alone or as part of a larger moiety as in "aralkyl," "aralkoxy," or "aryloxyalkyl," refers to monocyclic or bicyclic ring systems having a total of five to fourteen ring members, wherein at least one ring in the system is aromatic and wherein each ring in the system contains 3 to 7 ring members. The term "aryl" may be used interchangeably with the term "aryl ring." In certain embodiments of the present invention, "aryl" refers to an aromatic ring system and exemplary groups include phenyl, biphenyl, naphthyl, anthracyl and the like, which may bear one or more substituents. Also included within the scope of the term "aryl," as it is used herein, is a group in which an aromatic ring is fused to one or more non-aromatic rings, such as indanyl, phthalimidyl, naphthimidyl, phenanthridinyl, or tetrahydronaphthyl, and the like.

Downhole equipment: As used in the present disclosure, the term "downhole equipment" refers to devices used to measure conditions inside an oil or gas well. For example, in some embodiments, downhole equipment includes a pressure sensor for measuring pressure inside an oil well. In some embodiments, downhole equipment includes a temperature sensor for measuring temperature inside an oil well. In some embodiments, downhole equipment includes a pressure sensor and a temperature sensor. As used in the present disclosure, the term "oil well" means a boring (for example, a drilled hole or tunnel) in the earth that is designed to bring hydrocarbons (for example, oil) from an underground hydrocarbon reservoir to the surface.

In situ acid generation: As used in the present disclosure, the term "in situ acid generation" refers generally to the generation of acid "in one pot" where a reaction is intended to take place, as opposed to generating acid in one vessel and transferring it to a separate vessel for reaction. In some embodiments, in situ generation of acid comprises generating acid at a desired location where the acid is intended to react, for instance by generating acid in a subterranean reservoir downhole, as opposed to generating acid on the earth's surface and transferring it to a subterranean reservoir downhole.

Multifunctional, monofunctional, bifunctional, trifunctional: As used in the present disclosure, the terms "multifunctional", "monofunctional", "bifunctional", and "trifunctional" refer to a number of attachment sites of a particular compound, molecule, atom, etc. For example, in some embodiments, "monofunctional" refers to having one attachment site, "bifunctional" refers to having two attachment sites, "trifunctional" refers to having three attachment sites, "multifunctional" refers to having more than one attachment site, etc. In some embodiments, an exemplary bifunctional group may be an alkylene, such as methylene, represented by —$CH_2$—. In some embodiments, an exemplary trifunctional group may be a methine, represented by

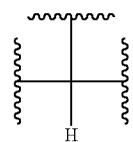 [SMILES: *C(*)*]

where ∿ represents a point of attachment.

DETAILED DESCRIPTION

It is contemplated that systems, devices, methods, and processes of the present application encompass variations and adaptations developed using information from embodiments described in the following description. Adaptation and/or modification of compositions, methods, and processes described in the following description may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, recited components, and that there are processes and methods according to the present application that consist essentially of, or consist of, recited processing steps.

It should be understood that order of steps or order for performing certain actions is immaterial so long as a described method remains operable. Moreover, two or more steps or actions may be conducted simultaneously.

Reference in the present application of any publication, for example, in the Background section, is not an admission that the publication serves as prior art with respect to any of the presented claims. The Background section is presented for purposes of clarity and is not meant as a description of prior art with respect to any claim. Headers are provided for the convenience of the reader and are not intended to be limiting with respect to claimed subject matter.

In Situ Acid Formation

The present disclosure encompasses the insight that certain compositions are useful for control of the generation of an acid capable of stimulation of a carbonate formation at a desirable time and/or location, as well as methods for generating acid at certain desirable times and/or locations, which allow for deeper penetration of an acid and/or use of less acid than previous methods. That is, there exists a need in various industries for controlled delivery of acid, whether inorganic or organic in nature, to site-specific locations as a means to remediate a wide range of challenges associated with, for instance, corrosive nature of acid, as well as difficulties and safety concerns associated with handling acid.

One manner of controlling delivery of an acid to a site-specific location is by generating an acid in situ. As used in this application, "in situ" acid generation refers generally to generation of acid "in one pot" where a reaction is intended to take place, as opposed to generating acid in one vessel and transferring it to a separate vessel for reaction. In some embodiments, in situ generation of acid comprises generating acid at a desired location where an acid is intended to react, for instance by generating acid in a subterranean reservoir downhole, as opposed to generating acid on the earth's surface and transferring it to a subterranean reservoir downhole. Accordingly, the present application describes, among other things, methods for generating acid (for instance, via in situ generation) using compositions comprising a combination of one or more oxidizing agents and one or more salts.

In some embodiments, compositions described in this application are useful in oil and gas applications, for instance, for stimulation of a subterranean formation. In some embodiments, in situ methods involve generating acid upon or after arriving at a formation, for example, by delivering reagents described in this application to a formation via a coiled tubing or bullheading in a production tube. In some embodiments, an acid is generated within a formation itself.

In some embodiments, a subterranean formation contains a hydrocarbon reservoir. In some embodiments, a subterranean formation comprises carbonates. In some embodiments, a subterranean formation comprises sandstone. In some embodiments, a subterranean formation comprises clastic sedimentary rock. For instance, in some embodiments, a subterranean formation comprises shale.

In some embodiments, compositions and methods described in this application are useful for acidizing a well formation, for instance water injection wells or disposal wells, or an injector, for instance to improve injectivity. In some embodiments, an injector is a water injector or a gas injector. In some embodiments, a disposal well is a water disposal well or a drill cuttings disposal well.

As compositions and methods described in this application are useful in a variety of applications in which controlled delivery of acid (for instance via in situ generation) is desired, applications of compositions and methods described in this application are not limited to the oil and gas industry or to other industries contemplated in this application.

Compositions

Described in this application are, among other things, compositions (e.g., aqueous fluids) useful for controlled delivery of acid, comprising a combination of one or more oxidizing agents and one or more salts.

In some embodiments, a composition comprises an aqueous fluid for controlled delivery of acid, where an aqueous fluid comprises (a) a sulfonate-based ammonium salt capable of being oxidized to produce acid; and (b) an oxidizing agent capable of oxidizing the ammonium salt. In some embodiments, an ammonium salt and oxidizing agent in an aqueous fluid react to produce acid at a temperature equal to or greater than 65° C.

In some embodiments, a composition comprises an aqueous fluid for in situ acid stimulation of a subterranean formation that contains a hydrocarbon reservoir, where an aqueous fluid comprises (a) a sulfonate-based ammonium salt capable of being oxidized to produce acid; and (b) an oxidizing agent capable of oxidizing the ammonium salt. In some embodiments, an ammonium salt and oxidizing agent in the aqueous fluid react to produce acid at a temperature equal to or greater than 65° C.

In some embodiments, compositions described in this application do not comprise a tertiary amine or a compound that reacts to form a tertiary amine salt in situ. For instance, in certain embodiments, compositions described in this application do not comprise a trialkylamine such as trimethylamine, triethylamine, tri-n-propylamine, tri-n-butylamine, dimethyldodecylamine, or dimethyltetradodecylamine.

Salt

Compositions described in this application for controlled delivery of acid (for instance, via in situ generation) comprise one or more salts which provide a source of hydrogen. In some embodiments, one or more salts are present in an aqueous fluid.

In some embodiments, a salt comprises a sulfonate-based ammonium salt. In some embodiments, an ammonium salt comprises an anion, which is an oxidation resistant anion. In some embodiments, a sulfonate-based anion of an ammonium salt is selected based on its reactivity, as measured by a temperature at which the ammonium salt reacts with a particular oxidizing agent.

In some embodiments, an ammonium salt comprises one or more N-substituted ammonium salts. In some such embodiments, an N-substituted ammonium salt is mono-substituted or di-substituted, for instance with one or two alkyl groups. In some such embodiments, an N-substituted ammonium salt is tri-substituted, for instance with three alkyl groups. Exemplary alkyl groups include methyl, ethyl, propyl, butyl, and the like. In some embodiments, an ammonium salt is not a tri-substituted ammonium salt. In some embodiments, an ammonium salt is not a tetra-substituted ammonium salt.

In some embodiments, an ammonium salt is selected from ammonium alkylsulfonates, ammonium arylsulfonates, ammonium alkarylsulfonates, and combinations thereof. In some embodiments, an ammonium salt is selected from substituted and unsubstituted ammonium alkylsulfonates, ammonium arylsulfonates, and combinations thereof. In some embodiments, an alkyl group of an alkylsulfonate anion is substituted with one or more of halogen, —OR, and —SR, wherein R is hydrogen or a $C_{1-6}$ alkyl. In some embodiments, an ammonium salt is selected from ammonium methanesulfonate, ammonium ethanesulfonate, ammonium propanesulfonate, ammonium butanesulfonate, ammonium trifluoromethanesulfonate, ammonium perfluorobutanesulfonate, ammonium chlorobenzenesulfonate, ammonium p-iodobenzenesulfonate, ammonium benzenesulfonate, ammonium p-toluenesulfonate, ammonium camphorsulfonate, and combinations thereof. In some embodiments, an ammonium salt is selected from ammonium methanesulfonate, ammonium trifluoromethanesulfonate, and ammonium perfluorobutanesulfonate.

In some embodiments, an ammonium salt is selected based on an intended application. A person of skill in the art, looking to prepare described compositions, will appreciate that various ammonium salts are suitable for use in delivering certain acids. Encompassed in the present disclosure is the recognition that sulfonate-based ammonium salts exhibit, in some embodiments, improved control over acid generation. Such improvement is a prolonged induction time for acid generation. That is, there is an increased delay of acid generation in situ when a selected ammonium salt is a sulfonate-based ammonium salt. For instance, where an intended application is stimulation of a carbonate formation, it is, in some embodiments, desirable to deliver an organic acid, for example methanesulfonic acid, to a zone of interest in a delayed fashion. For example, in some embodiments, ammonium methanesulfonate is selected as an ammonium salt. In some embodiments where an intended application is stimulation of a sandstone formation, it is desirable to generate a super acid, for example trifluoromethanesulfonic acid or triflic acid. In some embodiments, ammonium trifluoromethanesulfonate is selected as an ammonium salt. In some embodiments, where prolonged durations of time are needed to generate acid, a sulfonate-based ammonium salt having a higher degree of hydrophobicity is used. For example, in some embodiments, ammonium perfluorobutanesulfonate is selected as an ammonium salt.

In some embodiments, a sulfonate-based ammonium salt is tethered to a nanoparticle. In some embodiments, a sulfonate-based ammonium salt is tethered to a nanoparticle through one or more suitable metal salts.

For example, in some embodiments, a sulfonate-based ammonium salt-nanoparticle is represented by formula I:

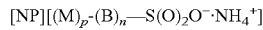

wherein:
[NP] is a suitable nanoparticle;
M is a metal salt;
B is a multifunctional repeating unit selected from aliphatic, heteroaliphatic, aryl, and combinations thereof;
p is 0 to 4; and
n is 1 to 20.

It is understood that a suitable nanoparticle can have, in some embodiments, 1 or more units of $[(M)_p\text{-}(B)_n\text{—}S(O)_2O^-\cdot NH_4^+]$ bound to the nanoparticle. For example, in some embodiments, a suitable nanoparticle has 1 to 5 units of $[(M)_p\text{-}(B)_n\text{—}S(O)_2O^-\cdot NH_4^+]$ bound to the nanoparticle. In some embodiments, a suitable nanoparticle has 1 to 4 units of $[(M)_p\text{-}(B)_n\text{—}S(O)_2O^-\cdot NH_4^+]$ bound to the nanoparticle. In some embodiments, a suitable nanoparticle has 1 to 3 units of $[(M)_p\text{-}(B)_n\text{—}S(O)_2O^-\cdot NH_4^+]$ bound to the nanoparticle. In some embodiments, a suitable nanoparticle has 1 to 2 units of $[(M)_p\text{-}(B)_n\text{—}S(O)_2O^-\cdot NH_4^+]$ bound to the nanoparticle. In some embodiments, a suitable nanoparticle has 1 unit of $[(M)_p\text{-}(B)_n\text{—}S(O)_2O^-\cdot NH_4^+]$ bound to the nanoparticle.

In some embodiments, a [NP] is a metal oxide nanoparticle. In some embodiments, a [NP] is a metal oxide nanoparticle of formula $M_xO_y$, wherein x and y are each independently selected from 1 to 5. In some embodiments, x is selected from 1 to 3. In some embodiments, y is selected from 1 to 5.

In some embodiments, a metal salt is or comprises silicon, cerium, zirconium, iron, cobalt, manganese, zinc, gadolinium, nickel, and the like.

As described generally above, p is 0 or 1. In some embodiments, p is 0. In some embodiments, p is 1.

As described generally above, B is a multifunctional repeating unit selected from aliphatic, heteroaliphatic, and aryl. It is understood that the multifunctional repeating unit refers to a unit that is bound in at least two positions on the unit, one to the metal salt or the nanoparticle directly (e.g., when p is 0), and the other to a sulfonate salt. A repeating group B can also repeat in a linear manner, e.g., B-B-B, or in a branched manner, e.g.,

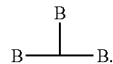

In some embodiments, B is aliphatic (e.g. a multifunctional aliphatic). In some embodiments, B is multifunctional $C_{1-12}$ aliphatic, wherein a $C_{1-12}$ aliphatic group is selected from $C_{1-12}$ alkyl, $C_{2-12}$ alkenyl, $C_{2-12}$ alkynyl, and combinations thereof. In some embodiments, B is multifunctional $C_{1-8}$ alkyl. In some embodiments, B is multifunctional $C_{1-6}$ alkyl. In some embodiments, B is multifunctional $C_{1-4}$ alkyl. In some embodiments B is bifunctional $C_{1-2}$ alkyl. In some embodiments, B is methylene. In some embodiments, B is ethylene. In some embodiments, B is propylene. In some embodiments, B is butylene. In some embodiments, B is multifunctional $C_{2-10}$ alkenyl. In some embodiments, B is multifunctional $C_{2-6}$ alkenyl. In some embodiments, B is multifunctional $C_{2-10}$ alkynyl. In some embodiments, B is multifunctional $C_{2-6}$ alkynyl. In some embodiments, an aliphatic group is substituted. Exemplary substituents on an aliphatic group include a halogen atom, —OR, —OC(O)R, —OCO$_2$R, —OC(O)N(R)$_2$, —OCN, —OSi(R)$_3$, —CO$_2$R, —C(O)N(R)$_2$, —C(N)N(R)$_2$, —CN, —N(R)$_2$, —NRC(O)R, —NRCO$_2$R, —NRC(O)N(R)$_2$, —NRC(N)R, —NRC(N)N(R)$_2$, —NO$_2$, —NROR, —SR, —Si(R)$_3$, or an optionally substituted group selected from $C_{1-20}$ aliphatic, $C_{1-20}$ heteroaliphatic, phenyl, a 3- to 8-membered saturated or partially unsaturated carbocycle, a 5- to 6-membered heteroaryl ring having 1-4 heteroatoms independently selected from nitrogen, oxygen, or sulfur, and a 3- to 8-membered saturated or partially unsaturated heterocyclic ring having 1-3 heteroatoms independently selected from nitrogen, oxygen, or sulfur, wherein R at each occurrence is independently hydrogen, $C_{1-6}$ aliphatic, or $C_{1-6}$ heteroaliphatic. In some embodiments, B comprises multifunctional heteroalkyl. In some embodiments, B comprises a bifunctional group —(CH$_2$)$_z$—O—(CH$_2$)$_z$—, wherein each z is independently from 0 to 12. In some embodiments, B comprises a bifunctional group —(CH$_2$)$_z$—NH—(CH$_2$)$_z$—, wherein each z is independently from 0 to 12. In some embodiments, B comprises a bifunctional group —(CH$_2$)$_z$—O—(CH$_2$)$_z$—NH—(CH$_2$)$_z$—, wherein each z is independently from 0 to 12.

In some embodiments, B is a multifunctional aryl group. In some embodiments, B is a bifunctional phenyl group. In some embodiments, B comprises a multifunctional aryl group linked to a multifunctional aliphatic group. In some such embodiments, $(B)_n$ comprises an alternating pattern of an aryl group and an aliphatic group or an aliphatic group and an aryl group.

As described generally above, n is 1 to 20. In some embodiments, n is 1 to 15. In some embodiments, n is 1 to 10. In some embodiments, n is 1 to 5. In some embodiments, n is 1 to 4. In some embodiments, n is 1 to 3. In some embodiments, n is 1 to 2. In some embodiments, n is 1. In some embodiments, n is 2. In some embodiments, n is 3. In some embodiments, n is 4. In some embodiments, n is 5.

For example, in some embodiments, a sulfonate-based salt is tethered to a nanoparticle through repeating units, as shown in The FIGURE. Without wishing to be bound by any particular theory, it is believed that such sulfonate-based functionalized nanoparticles exhibit a high surface to charge ratio, with a high occurrence of sulfonate functional groups, which, in some embodiments, provides a high concentration of acid-generating sites.

In some embodiments, a salt is present in an aqueous fluid at a concentration in a range of 0.001 M up to saturation (i.e., the maximum concentration of a salt dissolved in an aqueous fluid) as measured at 20° C. In some embodiments, a salt is present in an aqueous fluid at a concentration in a range of 0.1 M to 1.0 M, or 0.2 M to 0.9 M, or 0.3 M to 0.8 M, or 0.4 M to 0.7 M, or 0.5 M to 0.6 M. In some embodiments, a salt is present in an aqueous fluid at a concentration in a range of 0.1 M to 10.0 M, or 0.5 M to 10.0 M, or 1.0 M to 10.0 M, or 1.5 M to 10. M, or 2.0 M to 10.0 M, or 2.5 M to 9.5M, or 3.0 M to 9.0 M, or 3.5M to 8.5 M, or 4.0M to 8.5M, or 4.5M to 8.5M, or 5.0 M to 8.5M, or 5.5M to 8.5M, or 6.0 M to 8.5M, or 6.5 M to 8.5 M, or 7.0 M to 8.0 M.

Oxidizing Agents

Compositions described in this application for controlled delivery of acid (for instance, via in situ generation) comprise one or more oxidizing agents. In some embodiments, one or more oxidizing agents are present in an aqueous fluid.

In some embodiments, an oxidizing agent comprises any agent capable of oxidizing an ammonium salt. In some embodiments, an oxidizing agent is an inorganic oxidizer. In some embodiments, an oxidizing agent comprises an agent selected from the group consisting of a peroxide, a persulfate salt, a permanganate salt, a bromate salt, a perbromate salt, a chlorate salt, a perchlorate salt, an iodate salt, a periodate salt, and mixtures thereof. In certain embodiments, an oxidizing agent is a bromate salt. In some embodiments, an oxidizing agent is an alkali bromate salt. In certain embodiments, an oxidizing agent is or comprises sodium bromate. In some embodiments, an oxidizing agent is an organic oxidizer. In some embodiments, an oxidizing agent comprises an agent selected from the group consisting of benzoyl peroxide, 2-butanone peroxide, peracetic acid, and performic acid, and combinations thereof. In some embodiments, an oxidizing agent comprises an agent selected from the group consisting of peracetic acid and performic acid. In some embodiments, an oxidizing agent comprises a cation and an anion. In some embodiments, an oxidizing agent comprises an organic cation and an inorganic anion. In some embodiments, an anion comprises at least one of chlorate and bromate. In some embodiments, a cation comprises a phosphorous-containing ion substituted with alkyl, phenyl, or other groups, for example, bis(triphenylphosphine)iminium or tetraphenylphosphonium. In some embodiments, a cation comprises at least one of pyridinium pyrrolidinium, pyrazolium, and imidazolium.

In some embodiments, an oxidizing agent is present in an aqueous fluid at a concentration in a range of 0.001 M up to saturation as measured at 0° C. In some embodiments, an oxidizing agent is present in an aqueous fluid at a concentration in a range of 0.05 M to 1.0 M, or 0.05 M to 0.5 M, or 0.05 M to 0.4 M, or 0.05 M to 0.3 M, or 0.1 M to 0.3 M. In some embodiments, an oxidizing agent is present in an aqueous fluid at a concentration in a range of 0.5 M to 10.0 M, or 0.5 M to 9.5 M, or 0.5 M to 9.0 M, or 1.0 M to 9.0 M, or 2.0 M to 9.0M, or 3.0 M to 9.0M, or 4.0 M to 9.0 M or 5.0 M to 9.0 M, or 6.0 M to 9.0 M, or 6.0 M to 8.0 M, or 6.5 M to 7.5 M. In some embodiments, an oxidizing agent is present in an aqueous fluid at a concentration in a range of 1.0 M to 4.0 M, or 1.0 M to 0.0 M, or 1.5 M to 3.0 M, or 2.0 M to 3.0 M.

In some embodiments, an oxidizing agent comprises a bromate salt such as sodium bromate and is present in an aqueous fluid at a concentration in a range of 0.001 M to 2.4 M. In some embodiments, an oxidizing agent comprises sodium bromate and is present in an aqueous fluid at a concentration in a range of 0.01 M to 2.4 M, or 0.01 M to 2.2 M, or 0.01 M to 2.0 M, or 0.01 M to 1.8 M, or 0.01 M to 1.6 M, or 0.01 M to 1.4 M, or 0.01 M to 1.2 M, or 0.01 M to 1.0 M, or 0.01 M to 0.8 M, or 0.01 M to 0.6 M, or 0.01 M to 0.4 M, or 0.01 M to 0.2 M, or 0.01 M to 0.1 M, or 0.01 M to 0.09 M, or 0.02 M to 0.09 M, or 0.03 to 0.09 M, or 0.04 M to 0.09 M, or 0.05 M to 0.09 M, or 0.06 M to 0.08 M. In some embodiments, an oxidizing agent comprises sodium bromate and is present in an aqueous fluid at a concentration in a range of 0.1 M to 0.5M, or 0.1 M to 0.4M, or 0.1 M to 0.2M, or 0.3M to 0.4M, or 0.15 M to 0.25 M.

In some embodiments, an oxidizing agent is provided in an encapsulated form, for instance to delay its release. Encapsulated oxidizing agents are commercially available and are known to those of ordinary skill in the art. Exemplary such oxidizing agents include sodium persulfate, potassium persulfate, potassium bromate, and the like.

In some embodiments, an oxidizing agent is characterized in that it requires a threshold temperature to react with a salt of a composition described in this application. In other words, in some embodiments, an oxidizing agent will react once it passes a certain threshold temperature. For example, in some embodiments, a threshold temperature is 65° C. In some embodiments, an oxidizing agent is characterized in that it reacts at a temperature of 65° C. or greater. In some embodiments, an oxidizing agent reacts at a threshold temperature of 65° C., 70° C., 75° C., 80° C., 85° C. 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or 200° C. in order to react with a salt of a composition described in this application. In some embodiments, an oxidizing agent reacts at a threshold temperature of 210° C., 220° C., 230° C., 240° C., 250° C., 260° C., 270° C., 280° C., 290° C., or 300° C. in order to react with a salt of a composition described in this application. In some embodiments, an oxidizing agent is characterized in that it requires a threshold temperature in a range of 65° C. to 300° C. to react with a salt of a composition described in this application. In some embodiments, an oxidizing agent is characterized in that it requires a threshold temperature in a range of 65° C. to 200° C. to react with a salt of a composition described in this application. In some embodiments, an oxidizing agent is characterized in that it requires a threshold temperature in a range of 65° C. to 150° C. to react with a salt of a composition described in this application. In some embodiments, an oxidizing agent is characterized in that it requires a threshold temperature in a range of 150° C. to 300° C. to react with a salt of a composition described in this application. In some embodiments, an oxidizing agent is characterized in that it requires a threshold temperature in a range of 200° C. to 300° C. to react with a salt of a composition described in this application. In some embodiments, an oxidizing agent is characterized in that it requires a threshold temperature greater than ambient temperature to react with a salt of a composition described in this application.

In some embodiments, a threshold temperature is reduced, for instance by adding an amount of acid to a composition. In some embodiments, a threshold temperature is reduced, for example, by adding an accelerant to a composition. In some embodiments, an accelerant is a metal salt. Exemplary metal salts include, for example, $FeCl_2$, $CuI$, $TiCl_2$, and the like.

Methods for the Controlled Delivery of Acid

In some embodiments, the present application describes methods for controlled delivery of acid, comprising providing an aqueous fluid that comprises (a) a sulfonate-based ammonium salt capable of being oxidized to produce acid and (b) an oxidizing agent capable of oxidizing the ammonium salt. In some embodiments, an ammonium salt and an oxidizing agent in an aqueous fluid react to produce acid at a temperature equal to or greater than 65° C.

In some embodiments, the present application describes methods for in situ acid generation, a method comprising providing an aqueous fluid that comprises (a) a sulfonate-based ammonium salt capable of being oxidized to produce acid; and (b) an oxidizing agent capable of oxidizing the ammonium salt. In some embodiments, an ammonium salt and an oxidizing agent in an aqueous fluid react to produce acid at a temperature equal to or greater than 65° C.

In some embodiments, the present application describes methods for in situ acid stimulation of a subterranean formation that contains a hydrocarbon reservoir, a method comprising contacting a formation with an aqueous fluid that comprises (a) a sulfonate-based ammonium salt capable of being oxidized to produce acid and (b) an oxidizing agent capable of oxidizing the ammonium salt. In some embodiments, an ammonium salt and an oxidizing agent in an aqueous fluid react to produce acid at a temperature equal to or greater than 65° C.

In some embodiments, a step of contacting comprises introducing an aqueous solution into a formation via a coiled tubing or bullheading approach.

In some embodiments, a method is as described in this application, where a step of contacting comprises introducing an aqueous solution of an ammonium salt and an aqueous solution of an oxidizing agent into a formation via the same tubing (for example, the same coiled tubing) and allowing an aqueous fluid to form in situ within the tubing, within a formation or within an area around a wellbore.

Alternatively, in some embodiments, a method is as described in this application, where a step of contacting comprises introducing an aqueous solution of an ammonium salt and an aqueous solution of an oxidizing agent into a formation in separate stages (optionally via the same or different tubing, for example the same or different coiled tubing) and allowing an aqueous fluid to form in situ within a formation. In some embodiments, an aqueous solution of an ammonium salt is introduced into a formation before introduction of an oxidizing agent. In some embodiments, an aqueous solution of an oxidizing agent is introduced into a formation before introduction of an ammonium salt.

In some embodiments, an ammonium salt and/or an oxidizing agent is introduced into a formation via an emulsified and/or encapsulated form, thereby providing an increased delay of acid generation. Encapsulated oxidizing agent are commercially available and known to those of ordinary skill in the art. For example, encapsulated oxidizing agents include sodium persulfate, potassium persulfate, sodium bromate, potassium bromate, and the like.

In some embodiments, an ammonium salt and/or oxidizing agent is encapsulated in a polymer shell, an oil phase, or other type of shell structure that provides a controlled release of the reagent. In some embodiments, a polymer shell comprises one or more monomers that have undergone polymerization such that a polymer shell forms and encapsulates a reagent. In some embodiments, a polymer is an acrylate or methacrylate-based polymer. For example, in some embodiments, a monomer is selected from the group consisting of diurethane dimethacrylate, ethoxylated trimethylolpropane triacrylate, bisphenol-A glycerolate dimethacrylate, 1,6-hexanediol diacrylate, urethane acrylate oligomer, 2-hydroxyethylacrylate, and 2,2-bis[4-(2-acryloxyethoxyphenyl]propane. In some embodiments, an ammonium salt and/or oxidizing agent is encapsulated, for example, by placing a reagent as an internal phase of an emulsion (so-called "emulsified oxidizer slug") and then either causing or allowing the emulsion to break down by temperature exposure or by using a suitable breaker, for example a reagent capable of breaking an emulsion, that places active component(s) in contact with a formation, where reaction is desired. In some embodiments, an emulsion system is a water in oil emulsion, where a water phase contains an ammonium salt and/or oxidizer, and an oil phase is a continuous phase selected from diesel, solvent, crude oil or mineral oil. In some embodiments, a solvent is an organic solvent. In some embodiments, a solvent is xylene. In some embodiments, a water phase contains both an ammonium salt and an oxidizer, where a reaction generating acid takes place at a desired temperature and the emulsion will break at a desired location inside a pore space, not in a wellbore. In some embodiments, an oxidizer is encapsulated in an internal water phase, while an ammonium salt is contained in an external oil phase of an emulsion, where a reaction generating acid takes place at a desired temperature and the emulsion will break at a desired location inside a pore space, not in a wellbore. In some embodiments, an ammonium salt is encapsulated in an internal water phase, while an oxidizer is contained in an external oil phase of an emulsion, where a reaction generating acid takes place at a desired temperature and the emulsion will break at a desired location inside a pore space, not in a wellbore. In some embodiments, an ammonium salt is introduced in emulsified form, while the oxidizer is introduced without emulsification. In alternative embodiments, an oxidizer is introduced in emulsified form, while an ammonium salt is introduced without emulsification. In some embodiments, an ammonium salt is introduced in encapsulated form, while the oxidizer is introduced without encapsulation. In alternative embodiments, an oxidizer is introduced in encapsulated form, while an ammonium salt is introduced without encapsulation.

In some embodiments, an emulsion breaks down when exposed to outside stimuli, such as an elevated temperature, turbulent flow, etc., as described herein. In some embodiments, an emulsion breaker is introduced into to a formation. Suitable emulsion breakers are, in some embodiments, of a chemical and/or electrolytic nature. In some embodiments, an emulsion is formed with degradable surfactants or switchable surfactants. For example, in some embodiments, a surfactant used for emulsification is a degradable surfactant or switchable surfactant, which on heating will break and lose its emulsifying property, thus releasing the reagent(s). In some embodiments, once downhole, surfactants under heat will hydrolyze and break an emulsion, thus releasing a reagent(s). Additionally, in some embodiments, an emulsion is broken by being destabilized by heat and shear forces generated during introduction into a formation. In some embodiments, a formation and its components help in breaking an emulsion, for example, oil from a formation causes an emulsion to break.

In some embodiments, an ammonium salt and/or an oxidizing agent is encapsulated with a self-degradable coating. Without wishing to be bound by any particular theory, it is believed that such a coating provides a temporary barrier between ammonium salt and oxidizing agent to delay release of acid. Moreover, it is believed that composition of a degradable coating and thickness of such coating affords a particular time delay in releasing a reactant downhole. For example, availability of an encapsulated ammonium salt and/or oxidizing agent is dependent on rate of removal of degradable coating of an encapsulated reagent. In some embodiments, a thicker degradable coating degrades over a longer period of time. In some embodiments, susceptibility to an erosive environment is used to tune degradation time for a material. For example, a degradable material may be selected based on water solubility and/or susceptibility to heat degradation. Suitable encapsulation materials for a degradable coating of an ammonium salt and/or oxidizing agent include hydrated polymers, such as guar, chitosan, and polyvinyl alcohol or binders, such as carboxy ethyl cellulose or xanthan. In certain embodiments, carboxymethyl cellulose or xanthan is used to encapsulate an ammonium salt.

In some embodiments, extent of application of a degradable coating affects availability of an ammonium salt and/or oxidizing agent. In some embodiments, 30 wt % to 100 wt % of an ammonium salt and/or oxidizing agent is encapsulated. In some embodiments, 50 wt % to 90 wt % of an ammonium salt and/or oxidizing agent is encapsulated. In some embodiments, 40 wt % to 95 wt % of an ammonium salt and/or oxidizing agent is encapsulated. In some embodiments, 30 wt % to 60 wt % of an ammonium salt and/or oxidizing agent is encapsulated. In some embodiments, 60 wt % to 85 wt % of an ammonium salt and/or oxidizing agent is encapsulated.

Without wishing to be bound by any particular theory, it is believed that, in some embodiments, for a greater percentage an ammonium salt and/or oxidizing agent encapsulated, a longer delay in acid generation is observed. For example, when 100 wt % of an ammonium salt and/or oxidizing agent is encapsulated, reaction delay is controlled by erosion rate of a degradable coating and commensurate rate of availability of such ammonium salt and/or oxidizing agent. When, for example, only 30 wt % of an ammonium salt and/or oxidizing agent is encapsulated, 70 wt % of said reactant is available for reaction. It will be appreciated by one of skill in the art that in some embodiments, adjusting parameters of a degradable coating provides for tunability of a treatment fluid based on specific reservoir conditions.

In some embodiments, a method (or composition) is as described in this application, where functionality of a sulfonate-based anion prolongs generation of acid at 1 atmosphere and a temperature at or greater than 65° C. In some embodiments, a sulfonate-based ammonium salt is combined with suitable inorganic or organic acids as a means of tailoring a profile for acid generation.

In some embodiments, a sulfonate-based ammonium salt is combined with a suitable inorganic acid. In some embodiments, an inorganic acid is selected from the group consisting of hydrochloric acid, chloric acid, hydrobromic acid, sulfuric acid, nitric acid, perchloric acid, hydroiodic acid, phosphoric acid, and combinations thereof.

In some embodiments, a sulfonate-based ammonium salt is combined with an organic acid. In some embodiments, an organic acid is an acid comprising one or more carboxylic acids. In some embodiments, an organic acid is a polycarboxylic acid. For example, in some embodiments, an organic acid is an acid comprising at least two, three, four, five, six, seven, eight, nine, or ten carboxylic acids. Suitable organic acids include alkanesulfonic acids, arylsulfonic acids, alkyl carboxylic acids, aryl carboxylic acids, and combinations thereof. In some embodiments, an organic acid is selected from the group consisting of formic acid, acetic acid, methanesulfonic acid, p-toluenesulfonic acid, lactic acid, glycolic acid, malonic acid, fumaric acid, citric acid, tartaric acid, chloroacetic acid, dichloroacetic acid, trichloroacetic acid, fluoroacetic acid, difluoroacetic acid, trifluoroacetic acid, glutamic acid diacetic acid, methylglycindiacetic acid, 4,5-imidazoledicarboxylic acid, and combinations thereof. Various other organic acids are well known to those of skill in the chemical arts and are contemplated for use in compositions and methods described in the present application.

In some embodiments, a sulfonate-based ammonium salt is combined with a suitable acid-generating compound as a means of tailoring a profile for acid generation. In some embodiments, an acid-generating compound releases acid by hydrolysis. In some embodiments, an acid-generating compound comprises one or more ester and/or formate that are water soluble or partially water soluble. Exemplary acid-generating compounds include lactic acid derivatives, methyl lactate, ethyl lactate, propyl lactate, butyl lactate, and the like. In some embodiments, an acid-generating compound is a formate ester. Suitable formate esters include ethylene glycol monoformate, ethylene glycol diformate, diethylene glycol diformate, glyceryl monoformate, glyceryl diformate, glyceryl triformate, triethylene glycol diformate, and format esters of pentaerythritol. In some embodiments, an acid-generating compound is ethylene glycol monoformate or diethylene glycol diformate. In some embodiments, an acid-generating compound is a nitrile-containing compound. In some embodiments, an acid-generating compound is an ester, for instance, polyesters of glycerol including tripropionin (a triester of propionic acid and glycerol), trilactin, and esters of acetic acid and glycerol such as monoacetin, diacetin, and triacetin. In some embodiments, an acid-generating compound comprises an ester, aliphatic polyester, poly(lactide), poly(glycolide), pol (ε-caprolactone), poly(hydroxybutyrate), poly(anhydride), aliphatic polycarbonate, poly(amino acid), polyphosphazene, or copolymers thereof, or derivatives and combinations thereof.

In some embodiments, an acid-generating compound comprises ester, aliphatic polyester, orthoester, poly(orthoester), poly(lactide), poly(glycolide), poly(ε-caprolactone), poly(hydroxybutyrate), poly(anhydride), ethylene glycol monoformate, ethylene glycol diformate, diethylene glycol diformate, glyceryl monoformate, glyceryl diformate, glyceryl triformate, triethylene glycol diformate, formate esters of pentaerythritol or combinations thereof.

Temperature

In some embodiments, controlled delivery of an acid using compositions and methods described in this application comprises controlling a temperature at which an acid is generated. For instance, in some embodiments, a composition described in this application is designed (that is, components are selected) such that it requires a certain desired threshold temperature in order for an oxidizing agent to react with a salt to generate acid. In some embodiments, an ammonium salt and an oxidizing agent react to produce acid at a temperature equal to or greater than 65° C. In some embodiments, an ammonium salt and an oxidizing agent react to produce acid at a temperature equal to or greater than 65° C. in the absence of an accelerant and/or highly concentrated conditions. For instance, in some embodiments, compositions described in this application react at a temperature of at least 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 210° C., 220° C., 230° C., 240° C., 250° C., 260° C., 270° C., 280° C., 290° C., or 300° C. in order to generate acid. For instance, in some embodiments, compositions described in this application react at a temperature of at least 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or 200° C., in order to generate acid. In some embodiments, compositions described in this application react at a threshold temperature in a range of 65° C. to 300° C. in order to generate acid. In some embodiments, compositions described in this application react at a threshold temperature in a range of 65° C. to 200° C. in order to generate acid. In some embodiments, compositions described in this application react at a threshold temperature in a range of 65° C. to 190° C. in order to generate acid. In some embodiments, compositions described in this application react at a threshold temperature in a range of 65° C. to 180° C. in order to generate acid. In some embodiments, compositions described in this application react at a threshold temperature in a range of 65° C. to 170° C. in order to generate acid. In some embodiments, compositions described in this application react at a threshold temperature in a range of 65° C. to 160° C. in order to generate acid. In some embodiments, compositions described in this application react at a threshold temperature in a range of 65° C. to 150° C. in order to generate acid. In some embodiments, compositions described in this application react at a threshold temperature in a range of 65° C. to 140° C. in order to generate acid. In some embodiments, compositions described in this application react at a threshold temperature in a range of 65° C. to 130° C. in order to generate acid. In some embodiments, compositions described in this application react at a threshold temperature in a range of 65° C. to 120° C. in order to generate acid. In some embodiments, compositions described in this application react at a threshold temperature in a range of 100° C. to 300° C. in order to generate acid. In some embodiments, compositions described in this application react at a threshold temperature in a range of 120° C. to 300° C. in order to generate acid. In some embodiments, compositions described in this application react at a threshold temperature in a range of 150° C. to 300° C. in order to generate acid. In some embodiments, compositions described in this application react at a threshold temperature in a range of 200° C. to 300° C. in order to generate acid. In some embodiments, compositions described in this application react at a threshold temperature in a range of 100° C. to 250° C. in order to generate acid. In some embodiments, compositions described in this application react at a threshold temperature in a range of 150° C. to 250° C. in order to generate acid.

In some embodiments, heat for generation of an acid using compositions and methods described in this application occurs naturally at a location at which acid generation is desired. For instance, in some embodiments, heat comes from a subterranean formation, such as a limestone, sandstone, or shale formation. It will be appreciated that an actual threshold temperatures for generation of acid within a formation (which is under elevated pressure, for example, where pressure is greater than 1 atmosphere) may be less than those recited in this application.

Other Parameters

In some embodiments, a method (or composition) is as described in this application, where pH of an aqueous fluid at a temperature of less than 65° C., is greater than 5. In some such embodiments, pH is greater than 6. In some such embodiments, pH is greater than 7.

In some embodiments, a method (or composition) is as described in this application, where a sulfonate-based ammonium salt and an oxidizing agent react at a temperature as described above, and a pressure of 1 atmosphere. In some embodiments, a method (or composition) is as described in this application, where a sulfonate-based ammonium salt and an oxidizing agent react at a temperature as described above, and a pressure greater than 1 atmosphere. In some embodiments, a method (or composition) is as described in this application, where a sulfonate-based ammonium salt and an oxidizing agent react at a temperature as described above, and a pressure of at least 100 atmosphere. In some embodiments, a method (or composition) is as described in this application, where a sulfonate-based ammonium salt and an oxidizing agent react at a temperature as described above, and a pressure of at least 200 atmosphere. In some embodiments, a method (or composition) is as described in this application, where a sulfonate-based ammonium salt and an oxidizing agent react at a temperature as described above, and a pressure of at least 300 atmosphere. In some embodiments, a method (or composition) is as described in this application, here a sulfonate-based ammonium salt and an oxidizing agent react at a temperature as described above, and a pressure of at least 400 atmosphere. In some embodiments, a method (or composition) is as described in this application, where a sulfonate-based ammonium salt and an oxidizing agent react at a temperature as described above, and a pressure in a range of 1 to 100 atmosphere. In some embodiments, a method (or composition) is as described in this application, where a sulfonate-based ammonium salt and an oxidizing agent react at a temperature as described above, and a pressure in a range of 100 to 500 atmosphere. In some embodiments, a method (or composition) is as described in this application, where a sulfonate-based ammonium salt and an oxidizing agent react at a temperature as described above, and a pressure in a range of 100 to 350 atmosphere. In some embodiments, a method (or composition) is as described in this application, where a sulfonate-based ammonium salt and an oxidizing agent react at a temperature as described above, and a pressure in a range of 100 to 250 atmosphere.

In some embodiments, the present application describes methods for in situ acid stimulation of a subterranean formation that contains a hydrocarbon reservoir, where a formation comprises carbonates. In some embodiments, the present application describes methods for in situ acid stimulation of a subterranean formation that contains a hydrocarbon reservoir, where a formation comprises sandstone. In some embodiments, the present application describes methods for in situ acid stimulation of a subterranean formation that contains a hydrocarbon reservoir, where a formation comprises shale.

In some embodiments, a method (or composition) is as described in this application, where an ammonium salt comprises a salt selected from the group consisting of ammonium methanesulfonate, ammonium perfluorobutanesulfonate, ammonium trifluoromethanesulfonate, and mixtures thereof. In some such embodiments, an ammonium salt is present in an aqueous fluid at a concentration in a range of 0.001 M up to saturation.

In some embodiments, a method (or composition) is as described in this application, where an oxidizing agent comprises an agent selected from the group consisting of a peroxide, a persulfate salt, a permanganate salt, a bromate salt, and mixtures thereof. In some such embodiments, an oxidizing agent comprises a bromate salt. In some such embodiments, an oxidizing agent comprises sodium bromate. In some such embodiments, an oxidizing agent is present in an aqueous fluid at a concentration in a range of 0.001 M up to saturation.

In some embodiments, a method (or composition) is as described in this application, where an aqueous fluid does not contain a free tertiary amine salt or a compound which reacts to form a free tertiary amine salt in situ. For instance, in some such embodiments, an aqueous fluid does not comprise a trialkylamine such as trimethylamine, triethylamine, tri-n-propylamine, tri-n-butyl-amine, dimethyldodecylamine, or dimethyltetradecylamine.

EXAMPLES

In order that the application may be more fully understood, the following examples are set forth. It should be understood that these examples are for illustrative purposes only and are not to be construed as limiting in any manner.

Certain abbreviations shown in Table 1 are used in the following examples:

TABLE 1

| Chemical Name | Formula | Vendor |
|---|---|---|
| Methanesulfonic acid | $CH_4O_3S$ | BASF/BasoMSA |
| Ammonium hydroxide | $NH_4OH$ | Ward's Science |
| Ammonium methanesulfonate | $CH_7NO_3S$ | synthesized |
| Ammonium acetate | $NH_4CH_3CO_2$ | Sigma Aldrich |
| Ammonium trifluoroacetate | $NH_4CF_3CO_2$ | Sigma Aldrich |
| Ammonium trifluoromethanesulfonate | $CH_4F_3NO_3S$ | Acros/Sigma Aldrich |
| Ammonium perfluorobutanesulfonate | $C_4H_4F_9NO_3S$ | synthesized |
| Sodium bromate | $NaBrO_3$ | Fritz Industries |

In the following examples, the abbreviation "g" stands for grams, the abbreviation "mL" stands for milliliters, and the abbreviation "ppm" stands for parts per million and can also be expressed as milligrams per liter.

Example 1: Preparation of Ammonium Methanesulfonate

Ammonium methanesulfonate: A first aqueous solution containing 12.1 g (88 mmol) of methanesulfonic acid (70% w/w) in 25 mL of water was prepared in an Erlenmeyer flask. A second aqueous solution containing 6 mL of ammonium hydroxide (14.8 M) in 25 mL of water was prepared and added to the first solution. Additional ammonium hydroxide was added to basify the solution. The solvent was removed under reduced pressure, and ammonium methanesulfonate was isolated as a crystalline white solid (9.8 g, 99% yield, MP 196-198° C.)

Example 2: Preparation of Ammonium Perfluorobutanesulfonate

Ammonium perfluorobutanesulfonate: An aqueous solution containing 10 g (33.3 mmol) of perfluorobutanesulfonic acid in 50 mL of water was prepared. Effervescence was observed. The solution was diluted with an additional 50 mL of water, before carefully adding 2.25 mL of ammonium hydroxide (14.8 M, 33.3 mmol). Additional ammonium hydroxide was added to basify the solution. The solvent was removed under reduced pressure and ammonium perfluorobutanesulfonate was isolated as a solid (10.1 g, 97% yield).

Example 3: Reaction of Ammonium Sulfonate Salts $NH_4X$ (X=Acetate, Methanesulfonate, Perfluorobutanesulfonate, Trifluoroacetate, and Trifluoromethanesulfonate) and Sodium Bromate $NaBrO_3$ An aqueous solution of $NH_4X$ (X=acetate, methanesulfonate, perfluorobutanesulfonate, trifluoroacetate, and trifluoromethanesulfonate) (10 mmol) and $NaBrO_3$ (5 mmol) in 25 mL of water was prepared in a glass pressure tube. The reaction vessel was sealed and heated in a pre-heated silicone oil bath at temperatures up to 150° C. until the reaction proceeded to completion. Evolution of bromine gas was evidenced by the change in color of the reaction mixture from colorless to orange. The acid concentration of the solution was measured via titration methods. A summary of reaction times for each of these reactions is presented in Table 2. Inclusion of acetate and trifluoroacetate ammonium salts in this study was used for comparative purposes. The results presented in Table 2 illustrate a superior induction performance of sulfonate-based ammonium salts. Induction time observed for provided sulfonate-based ammonium salts is unexpectedly prolonged as compared to previous studies. See, for example, U.S. Patent Publication No 2019/0010385 A1.

TABLE 2

| Anion | pKa | Induction Time (h) |
|---|---|---|
| Acetate | 4.7 | no reaction |
| Trifluoroacetate | −0.44 | 0.44 |
| Methanesulfonate | −2.9 | 0.75 |
| Trifluoromethanesulfonate | −15.0 | 0.75 |
| Perfluorobutanesulfonate | −3.31 | 1.17 |

OTHER EMBODIMENTS

Certain embodiments of the present application were described supra. It is, however, expressly noted that the application is not limited to those embodiments, but rather the intention is that additions and modifications to what was expressly described in the present disclosure are also included within the scope of the application. Moreover, it is to be understood that the features of the various embodiments described in the present disclosure were not mutually exclusive and can exist in various combinations and permutations, even if such combinations or permutations were not made express, without departing from the spirit and scope of the application. Therefore, the disclosure should not be limited to certain implementations.

What is claimed is:

1. A method for in situ acid stimulation of a subterranean formation that contains a hydrocarbon reservoir, the method comprising:
contacting the subterranean formation with (a) a sulfonate-based ammonium salt capable of being oxidized to produce acid, and (b) an oxidizing agent capable of oxidizing the sulfonate-based ammonium salt, where the sulfonate-based ammonium salt and the oxidizing agent react to produce the acid; and stimulating the subterranean formation with the produced acid.

2. The method of claim 1, where the subterranean formation comprises carbonates, sandstone, or shale.

3. The method of claim 1, where the sulfonate-based ammonium salt comprises a salt selected from the group consisting of ammonium methanesulfonate, ammonium perfluorobutanesulfonate, ammonium trifluoromethanesulfonate, and mixtures thereof.

4. The method of claim 1, where the sulfonate-based ammonium salt comprises ammonium methanesulfonate.

5. The method of claim 1, where the sulfonate-based ammonium salt comprises ammonium trifluoromethanesulfonate.

6. The method of claim 1, where the sulfonate-based ammonium salt comprises ammonium perfluorobutanesulfonate.

7. The method of claim 1, where the sulfonate-based ammonium salt is tethered to a nanoparticle to form a sulfonate based-ammonium salt-nanoparticle.

8. The method of claim 7, where the sulfonate-based ammonium salt is tethered to the nanoparticle through one or more metal salts.

9. The method of claim 7, where the sulfonate-based ammonium salt nanoparticle is represented by formula I:

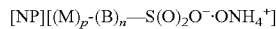

wherein [NP] is the nanoparticle, M is a metal salt, B is a multifunctional repeating unit selected from aliphatic, heteroaliphatic, and aryl, p is 0 or 1, and n is 0 to 20.

10. The method of claim 9, where the multifunctional repeating unit is the aliphatic, wherein the aliphatic is selected from $C_{1-12}$ alkyl, $C_{2-12}$ alkenyl, $C_{2-12}$ alkynyl, and combinations thereof, and n is 1 to 20.

11. The method of claim 1, where the oxidizing agent comprises an agent selected from the group consisting of a peroxide, a persulfate salt, a permanganate salt, a bromate salt, a perbromate salt, a chlorate salt, a perchlorate salt, an iodate salt, a periodate salt, and mixtures thereof.

12. The method of claim 1, where the sulfonate-based ammonium salt is contacted with the subterranean formation in an aqueous fluid at a concentration in the range of 0.1 M to 10.0 M.

13. The method of claim 1, where the oxidizing agent is contacted with the subterranean formation in an aqueous fluid at a concentration in the range of 0.001 M to 2.4 M.

14. The method of claim 1, where the sulfonate-based ammonium salt and the oxidizing agent react at a temperature in a range of 65° C. to 300° C. to produce the acid.

15. The method of claim 1, where the sulfonate-based ammonium salt, the oxidizing agent, or both are contacted with the subterranean formation in one or more aqueous fluid that does not contain a free tertiary amine salt or a compound which reacts to form a free tertiary amine salt in situ.

16. A method for in situ acid treatment of a subterranean formation, the subterranean formation comprising a well selected from a group consisting of water injection well, a gas injection well, a water disposal well, and a drill cuttings disposal well, the method comprising:

contacting the formation with an aqueous fluid that comprises (a) sulfonate-based ammonium salt capable of being oxidized to produce acid, and (b) an oxidizing agent capable of oxidizing the ammonium salt, where the ammonium salt and oxidizing agent in the aqueous fluid react to produce the acid; and treating the subterranean formation with the produced acid.

17. The method of claim 16, wherein the sulfonate-based ammonium salt and the oxidizing agent react at a temperature in a range of 65° C. to 300° C. to produce the acid.

* * * * *